(12) United States Patent
Ma (10) Patent No.: US 11,270,388 B2
(45) Date of Patent: Mar. 8, 2022

(54) BLOCKCHAIN-BASED DATA PROCESSING METHOD AND APPARATUS

(71) Applicant: ADVANCED NEW TECHNOLOGIES CO., LTD., George Town (KY)

(72) Inventor: Sui Ma, Hangzhou (CN)

(73) Assignee: ADVANCED NEW TECHNOLOGIES CO., LTD., George Town (KY)

(*) Notice: Subject to any disclaimer, the term of this patent is extended or adjusted under 35 U.S.C. 154(b) by 0 days.

(21) Appl. No.: 17/163,659

(22) Filed: Feb. 1, 2021

(65) Prior Publication Data

US 2021/0158455 A1 May 27, 2021

Related U.S. Application Data (63) Continuation of application No. PCT/CN2019/115015, filed on Nov. 1, 2019.

(30) Foreign Application Priority Data

Dec. 21, 2018 (CN) .......................... 201811573423.7

(51) Int. Cl.
*H04L 9/08* (2006.01)
*G06Q 40/08* (2012.01)

(52) U.S. Cl.
CPC .......... *G06Q 40/08* (2013.01); *H04L 9/0825* (2013.01); *H04L 2209/38* (2013.01); *H04L 2209/46* (2013.01)

(58) Field of Classification Search
CPC .................. H04L 2209/38; H04L 2209/46
See application file for complete search history.

(56) References Cited

U.S. PATENT DOCUMENTS 9,998,286 B1 * 6/2018 Ramathal ............... G16H 40/63
10,305,833 B1 * 5/2019 Dennis .................... H04L 51/12
(Continued)

FOREIGN PATENT DOCUMENTS

CN 106600252 A 4/2017
CN 107251595 A 10/2017
(Continued)

OTHER PUBLICATIONS

Michael Mainelli et al., Chain Reaction: How Blockchain Technology Might Transform Wholesale Insurance, Jul. 2016, published by Long Finance, pp. 1-58 (Year: 2016).*

(Continued)

*Primary Examiner* — Ellen Tran (57) ABSTRACT

A blockchain-based data processing method and apparatus are provided. The method comprises: by a node device of a service acceptance platform, receiving service processing application data of a target user; generating a first service processing result; encrypting the first service processing result using a public key of a node device of a service processing entity; and sending, a first transaction to a blockchain for the first transaction to be recorded in a distributed database of the blockchain upon verification of the first transaction by a plurality of node devices associated with the blockchain according to a consensus mechanism, wherein: the first transaction comprises the encrypted first service processing result, and the plurality of node devices associated with the blockchain comprises the node device of the service acceptance platform and the node device of the service processing entity.

20 Claims, 4 Drawing Sheets

(56) References Cited

U.S. PATENT DOCUMENTS

| | | | |
|---|---|---|---|
| 10,318,932 B2 | 6/2019 | Bower et al. | |
| 10,396,985 B1* | 8/2019 | Nagelberg | H04L 9/0866 |
| 10,521,780 B1* | 12/2019 | Hopkins, III | G06Q 20/12 |
| 10,713,727 B1* | 7/2020 | Floyd | G07C 5/085 |
| 10,833,843 B1* | 11/2020 | Vijayvergia | H04L 9/30 |
| 2016/0217532 A1 | 7/2016 | Slavin | |
| 2016/0241402 A1 | 8/2016 | Gordon et al. | |
| 2017/0046652 A1* | 2/2017 | Haldenby | H04L 9/0816 |
| 2017/0116693 A1 | 4/2017 | Rae et al. | |
| 2017/0132421 A1 | 5/2017 | Unitt | |
| 2017/0221029 A1 | 8/2017 | Lund et al. | |
| 2017/0337534 A1 | 11/2017 | Goeringer et al. | |
| 2018/0018723 A1* | 1/2018 | Nagla | H04L 63/08 |
| 2018/0189878 A1 | 7/2018 | Uhr et al. | |
| 2018/0260909 A1 | 9/2018 | Li | |
| 2018/0341910 A1 | 11/2018 | Broveleit | |
| 2018/0365201 A1 | 12/2018 | Hunn et al. | |
| 2019/0068365 A1 | 2/2019 | Wright et al. | |
| 2019/0180275 A1 | 6/2019 | Safak | |
| 2019/0287095 A1 | 9/2019 | Gaddam et al. | |
| 2021/0014072 A1 | 1/2021 | Liu et al. | |

FOREIGN PATENT DOCUMENTS

| | | |
|---|---|---|
| CN | 107341702 A | 11/2017 |
| CN | 107704269 A | 2/2018 |
| CN | 108009834 A | 5/2018 |
| CN | 108230109 A | 6/2018 |
| CN | 108280628 A | 7/2018 |
| CN | 108550079 A | 9/2018 |
| CN | 108665372 A | 10/2018 |
| CN | 108665946 A | 10/2018 |
| CN | 108694669 A | 10/2018 |
| CN | 108711108 A | 10/2018 |
| CN | 109478282 A | 3/2019 |
| CN | 109697365 A | 4/2019 |
| CN | 109919604 A | 6/2019 |
| CN | 110020543 A | 7/2019 |
| CN | 106982205 B | 5/2020 |
| CN | 105373955 B | 7/2020 |
| JP | 2019506074 A | 2/2019 |
| KR | 101835520 B1 | 4/2018 |
| KR | 101862860 B1 | 5/2018 |
| TW | M554608 U | 1/2018 |
| WO | 2018/220541 A1 | 12/2018 |
| WO | 2019015474 A1 | 1/2019 |

OTHER PUBLICATIONS

Tsung-Ting Kuo et al., Blockchain distributed ledger technologies for biomedical and health care applications, Sep. 8, 2017, published by Journal of the American Medical Infomatics Association, pp. 1-10 (Year: 2017).*

Search Report for Taiwanese Application No. 108136239 dated Jul. 22, 2020.

Written Opinion and International Search Report for PCT Application No. PCT/CN2019/115015 dated Feb. 5, 2020.

First Search for Chinese Application No. 201811573423.7 dated Feb. 11, 2020.

Supplementary Search for Chinese Application No. 201811573423.7 dated Mar. 17, 2020.

Supplementary Search for Chinese Application No. 201811573423.7 dated Aug. 3, 2020.

Dawei Zhao, "Study on the Application of Block Chain in Internet Insurance Industry," Internet Finance Research Center, Dec. 31, 2016.

Lianzeng Zhang, "Thoughts on the application of blockchain insurance," Information System Engineering, Jul. 31, 2018.

Shan Xing, "Building a digital insurance policy system based on blockchain technology", Knowledge economy, Aug. 31, 2018.

* cited by examiner

BLOCKCHAIN-BASED DATA PROCESSING METHOD AND APPARATUS

CROSS-REFERENCE TO RELATED APPLICATION

This application is a continuation application of International Patent Application No. PCT/CN2019/115015, filed with the China National Intellectual Property Administration (CNIPA) on Nov. 1, 2019, which is based on and claims priority to and benefits of Chinese Patent Application No. 201811573423.7, filed with the CNIPA on Dec. 21, 2018. The entire content of the above-identified applications is incorporated herein by reference.

TECHNICAL FIELD

The specification relates to the field of data processing technologies, and in particular, to a blockchain-based data processing method and apparatus.

BACKGROUND

The blockchain technology, also referred to as a distributed ledger technology, is an emerging technology in which a plurality of computing devices participate in "accounting" to jointly maintain a complete distributed database. Because the blockchain technology features decentralization, openness, and transparency, all the computing devices can participate in database recording, and quick data synchronization can be performed among the computing devices. Therefore, the blockchain technology has been widely applied to many fields.

SUMMARY

In view of this, one or more embodiments of the specification provide a blockchain-based data processing method and apparatus, and a computer device.

To achieve the foregoing objective, one or more embodiments of the specification provide the following technical solutions.

According to a first aspect of one or more embodiments of the specification, a blockchain-based data processing method is provided, where a blockchain includes a node device of a service acceptance platform and a node device of a service data processing entity, and the method includes:
  receiving, by the node device of the service acceptance platform, service processing application data of a target user;
  generating a first service processing result according to a preset first service processing step and based on the service processing application data; and
  sending a first transaction to the blockchain, where the first transaction includes the first service processing result, for the first transaction to be recorded in a distributed database of the blockchain after consensus verification by the blockchain, and the first service processing result is used for allowing the node device of the service data processing entity to generate a second service processing result according to a preset second service processing step and based on the first service processing result.

In an embodiment, a blockchain-based data processing method is provided. The method comprises: receiving, by a node device of a service acceptance platform, service processing application data of a target user; generating, by the node device of the service acceptance platform based on the service processing application data, a first service processing result; encrypting, by the node device of the service acceptance platform, the first service processing result using a public key of a node device of a service processing entity; and sending, by the node device of the service acceptance platform, a first transaction to a blockchain for the first transaction to be recorded in a distributed database of the blockchain upon verification of the first transaction by a plurality of node devices associated with the blockchain according to a consensus mechanism, wherein: the first transaction comprises the encrypted first service processing result, and the plurality of node devices associated with the blockchain comprises the node device of the service acceptance platform and the node device of the service processing entity.

In an embodiment, the method further comprises: obtaining, by the node device of the service acceptance platform from the distributed database of the blockchain, a second transaction comprising a second service processing result of the target user generated by the node device of the service processing entity; and sending the second service processing result to the target user.

In an embodiment, the second service processing result is encrypted using a public key of the node device of the service acceptance platform.

In an embodiment, the service acceptance platform comprises an insurance application acceptance platform, the target service data processing entity comprises an insurance application review agency, the service processing application data comprises insurance application data of the target user, the first service processing result comprises insurance policy application data, and the second service processing result comprises an insurance application result of the target user.

In an embodiment, the service acceptance platform comprises a claim settlement acceptance platform, the target service data processing entity comprises a claim settlement review agency, the service processing application data comprises claim settlement application data of the target user, the first service processing result comprises claim settlement report data, and the second service processing result comprises a compensation result for the target user.

In an embodiment, the blockchain is a consortium blockchain, and the node device of the service acceptance platform and the node device of the service data processing entity are consortium member node devices of the consortium blockchain.

In an embodiment, the method further comprises: obtaining, by the node device of the service data processing entity from the distributed database of the blockchain, the first transaction; generating, by the node device of the service data processing entity, a second service processing result based on the first service processing result; encrypting, by the node device of the service data processing entity, the second service processing result using a public key of the node device of the service acceptance platform; and sending, by the node device of the target service data processing entity, a second transaction to the blockchain for the second transaction to be recorded in the distributed database of the blockchain upon verification of the second transaction by the plurality of node devices associated with the blockchain according to the consensus mechanism, wherein the second transaction comprises the encrypted second service processing result.

According to a second aspect of one or more embodiments of the specification, a blockchain-based data processing method is provided, where a blockchain includes a node device of a service acceptance platform and a node device of a service data processing entity, and the method includes:

obtaining, by the node device of the service data processing entity from a distributed database of the blockchain, a first transaction sent by the node device of the service acceptance platform, where the first transaction includes a first service processing result, and the first service processing result is generated by the node device of the service acceptance platform according to a preset first service processing step and based on received service processing application data of a target user;

generating a second service processing result according to a preset second service processing step and based on the first service processing result; and sending a second transaction to the blockchain, where the second transaction includes the second service processing result, for the second transaction to be recorded in the distributed database of the blockchain after consensus verification by the blockchain.

According to a third aspect of one or more embodiments of the specification, a blockchain-based data processing apparatus is provided, where a blockchain includes a node device of a service acceptance platform and a node device of a service data processing entity, and the apparatus includes:

a receiving unit, configured to receive service processing application data of a target user;

a generating unit, configured to generate a first service processing result according to a preset first service processing step and based on the service processing application data; and a sending unit, configured to send a first transaction to the blockchain, where the first transaction includes the first service processing result, for the first transaction to be recorded in a distributed database of the blockchain after consensus verification by the blockchain, and the first service processing result is used for allowing the node device of the service data processing entity to generate a second service processing result according to a preset second service processing step and based on the first service processing result.

According to a fourth aspect of one or more embodiments of the specification, a blockchain-based data processing apparatus is provided, where a blockchain includes a node device of a service acceptance platform and a node device of a service data processing entity, and the apparatus includes:

an obtaining unit, configured to obtain a first transaction sent by the node device of the service acceptance platform from a distributed database of the blockchain, where the first transaction includes a first service processing result, and the first service processing result is generated by the node device of the service acceptance platform according to a preset first service processing step and based on received service processing application data of a target user;

a generating unit, configured to generate a second service processing result according to a preset second service processing step and based on the first service processing result; and a sending unit, configured to send a second transaction to the blockchain, where the second transaction includes the second service processing result, for the second transaction to be recorded in the distributed database of the blockchain after consensus verification by the blockchain.

According to a fifth aspect of one or more embodiments of the specification, a computer device is provided, including a memory and a processor, where the memory stores a computer program runnable by the processor, and the processor, when running the computer program, performs the blockchain-based data processing method performed by the node device of the service acceptance platform.

According to a sixth aspect of one or more embodiments of the specification, a computer device is provided, including a memory and a processor, where the memory stores a computer program runnable by the processor, and the processor, when running the computer program, performs the blockchain-based data processing method performed by the node device of the service data processing entity.

According to a seventh aspect of one or more embodiments of the specification, a system for blockchain-based data-processing, comprising a processor and a non-transitory computer-readable storage medium storing instructions executable by the processor to cause the system to perform operations. The operations comprise: receiving service processing application data of a target user; generating, based on the service processing application data, a first service processing result; encrypting the first service processing result using a public key of a node device of a service processing entity; and sending a first transaction to a blockchain for the first transaction to be recorded in a distributed database of the blockchain upon verification of the first transaction by a plurality of node devices associated with the blockchain according to a consensus mechanism, wherein: the first transaction comprises the encrypted first service processing result, and the plurality of node devices associated with the blockchain comprises the node device of the service acceptance platform and the node device of the service processing entity.

According to an eighth aspect of one or more embodiments of the specification, a non-transitory computer-readable storage medium for image processing, configured with instructions executable by one or more processors to cause the one or more processors to perform operations. The operations comprise: receiving service processing application data of a target user; generating, based on the service processing application data, a first service processing result; encrypting the first service processing result using a public key of a node device of a service processing entity; and sending a first transaction to a blockchain for the first transaction to be recorded in a distributed database of the blockchain upon verification of the first transaction by a plurality of node devices associated with the blockchain according to a consensus mechanism, wherein: the first transaction comprises the encrypted first service processing result, and the plurality of node devices associated with the blockchain comprises the node device of the service acceptance platform and the node device of the service processing entity.

In the blockchain-based data processing method and apparatus provided in the specification, terminals of a service acceptance platform and a service data processing entity are set as node devices of a blockchain, and service processing result data obtained by both entities through processing is transmitted and obtained by using a distributed database of the blockchain, which not only ensures the timeliness of the transmitted data, but also ensures that the transmitted data is tamper-proof.

DETAILED DESCRIPTION

The embodiments are described herein in detail, and some of the embodiments are shown in the accompanying drawings. When the following descriptions are made with reference to the accompanying drawings, unless otherwise indicated, same numbers in different accompanying drawings represent same or similar elements. The implementations described in the following embodiments are not all the implementations consistent with one or more embodiments of the specification, but are only some of methods and apparatuses that are described in detail in the appended claims and that are consistent with some aspects of one or more embodiments of the specification.

In other embodiments, the steps of corresponding methods are not necessarily performed according to sequences shown and described in the specification. In some other embodiments, the methods may include more or fewer steps than those described in the specification. In addition, a single step described in the specification may be divided into a plurality of steps in other embodiments, and a plurality of steps described in the specification may be combined into a single step in other embodiments.

With the development of various Internet-based service processing modes, a service mode in which a service acceptance platform serves as a front end and a plurality service agencies serve as a back end gradually become popular among various service processing agencies due to advantages of wide and efficient service processing and low service promotion costs. Currently, there are two types of common solutions for data exchange between the front end of the service acceptance platform and the backend of the service processing agency. In solution 1, data synchronization is performed based on a real-time interface of the http protocol. In solution 2, data synchronization is performed based on a T+1 file of the File Transfer Protocol (ftp). Although data synchronization between the front end of the service acceptance platform and the backend of the service processing agency may be implemented in both solutions described above, each solution has many problems.

For example, there is a coupling relationship between nodes connected based on the http protocol, resulting in high maintenance costs and security risks such as data leakage. It requires additional technical costs to resolve the security risks. Moreover, such a technology has high connection and debugging costs. Generally, two entities of the connection need to agree on interface access parameters and verify a signature, and the service logic requires the two entities to respond to each other. Therefore, it requires cooperation of a plurality of systems of two nodes to complete the solution. Therefore, in the conventional HTTP protocol, systems of the two nodes are required to build one or more gateway systems based on the original service system, and one interface call needs to circulate in the gateway systems to finally reach a service system that actually needs to complete the action. The entire link is long and complex. In a data transmission mode in the ftp protocol, due to use of a transmission frequency of T+1, it is hard to ensure the timeliness of data. Data is transmitted in batches in the form of files. Once an error occurs in a file in the batch data, it is extremely costly to recall, and file parsing is also costly. Therefore, supervision and warning cannot be completed efficiently in a timely manner.

Figure 1:
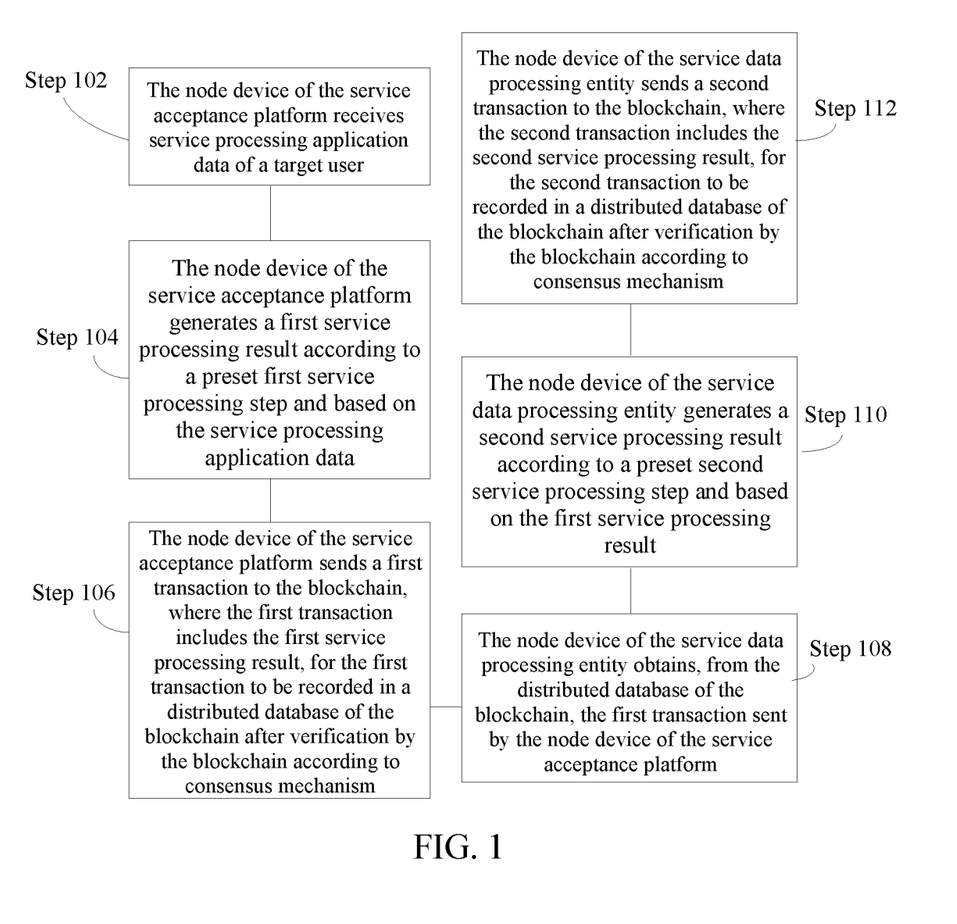
FIG. 1 is a schematic flowchart of a blockchain-based data processing method, according to an embodiment of the specification.

In view of the foregoing described technical status and problem, FIG. 1 is a schematic flowchart of a blockchain-based data processing method, according to an embodiment of the specification. The blockchain includes a node device of a service acceptance platform and a node device of a service data processing entity.

A service acceptance platform described in this embodiment may include a plurality of types of user-oriented service acceptance platforms established based on a network, but not limited to, an insurance-related service acceptance platform, a financing-product-related service acceptance platform, and a supply-chain-related service acceptance platform. A service data processing entity described in this embodiment is an agency performing corresponding service processing based on a service application accepted by the service acceptance platform.

The blockchain described in this embodiment may refer to a peer-to-peer (P2P) network system with a distributed data storage structure that is constructed with nodes using a consensus mechanism. Data in the blockchain is distributed in "blocks" connected temporally, each block contains a data digest of a previous block, and full data backup of all or some of the nodes is achieved depending on different consensus mechanisms, such as proof of work (PoW), proof of stake (PoS), delegated proof of stake (DPoS), or Practical Byzantine Fault Tolerance (PBFT). It is well known by a person skilled in the art that, because the blockchain network operates under a corresponding consensus mechanism, it is difficult for any node to tamper with data recorded in the blockchain database. For example, in a blockchain using the PoW consensus, at least 51% of computing power of the entire network is needed to tamper with existing data. Therefore, compared with other centralized database systems, the blockchain system has the unmatched characteristics of ensuring data security and preventing attacks and tampering. In the embodiments provided in the specification, data recorded in a distributed database of the blockchain will not be attacked or tampered with, which ensures authenticity and reliability of data transmission performed by the service acceptance platform and the service data processing entity based on the distributed database of the blockchain.

Both the node device of the service acceptance platform and the node device of the service data processing entity described in this embodiment may join the blockchain by following a corresponding node protocol and installing a node protocol program, to serve as nodes of the blockchain. A node device with full backup of data in the distributed database of the blockchain is usually referred to as a full node by a person skilled in the art, and a node device with partial backup data (for example, only data of a block header) in the distributed database of the blockchain is referred to as a light node, a client, or the like. The node device of the service acceptance platform and the node device of the service data processing entity described in this embodiment may include the foregoing full node, light node, or client. Any device that is directly or indirectly connected to the blockchain and that may send or obtain data in the distributed database of the blockchain may be referred to as the node device described in this embodiment.

As shown in FIG. 1, the blockchain-based data processing method includes:

Step 102: The node device of the service acceptance platform receives service processing application data of a target user.

The service processing application data of the target user received by the node device of the service acceptance platform described in this embodiment may include various possible Internet-based service processing application data, for example, insurance application data or claim settlement application data, financing product purchasing or redeeming application data, or product purchasing, payment or transfer of receivables in a supply chain or financial loan application data such as mortgage loan. The target user described in this embodiment may be an individual user, or may be an institutional user.

Step 104: The node device of the service acceptance platform generates a first service processing result according to a preset first service processing step and based on the service processing application data.

After accepting a service processing application of the target user, the service acceptance platform usually performs service processing in advance based on a first service processing step preset by the platform and the service processing application data, to generate a first service processing result. For example, an insurance application acceptance platform may generate insurance policy data of the target user in a preset format based on insurance application data of the target user. The insurance policy data, that is, the first service processing result, may include data such as identity information of the target user, an insurance application type, and an insurance application qualification certificate material, for an insurance company acting as the service data processing entity to check an insurance application of the target user.

In an embodiment, after accepting a service processing application of the target user, some service acceptance platforms may omit the first service processing step and directly use the service processing application of the target user as the first service processing result.

Step 106: The node device of the service acceptance platform sends a first transaction to the blockchain, where the first transaction includes the first service processing result, for the first transaction to be recorded in a distributed database of the blockchain upon verification of the first transaction by the node devices associated with the blockchain according to a consensus mechanism.

The transaction described in the specification refers to a piece of data that is created by each user through a node device end of the blockchain and that needs to be finally published to the distributed database of the blockchain. The transaction in the blockchain includes a transaction in a narrow sense and a transaction in a broad sense. The transaction in a narrow sense refers to a value transfer published by the user to the blockchain. For example, in a conventional bitcoin blockchain network, a transaction may be a transfer initiated by the user in the blockchain. The transaction in a broad sense refers to a piece of service data with a service intent published by the user to the blockchain. For example, the transaction may be a service (such as a leasing service, a vehicle scheduling service, an insurance claim settlement service, a credit service, or a medical service) message or a service request with a service intent that is published by the user to the blockchain and that is irrelevant to value transfer. The first transaction described in this embodiment includes a piece of service data of the first service processing result. The first service processing result may be encapsulated into the first transaction according to a preset transaction format, and then the first transaction is uploaded to the blockchain.

Because the first service processing result included in the first transaction usually includes privacy information of the target user such as health information or financial information, to avoid unexpected leakage or misuse of the privacy information of the target user, in the preset transaction format, encryption processing may be performed on the first service processing result included in the first transaction. In an embodiment, an encryption manner of the encryption processing may be encrypting the first service processing result using a public key of a node device of the service data processing entity corresponding to the first service processing result. In this way, after obtaining the first service processing result, the corresponding node device of the service data processing entity may perform decoding using a private key of the node device of the service data processing entity, to obtain plaintext information of the first service processing result, thereby reducing a security risk of data leakage when data is transmitted on the blockchain.

A detail process of uploading the first transaction to the distributed database of the blockchain described in the foregoing embodiment may be set according to a consensus mechanism and a transaction rule of the blockchain. In an embodiment, the uploading the first transaction to the distributed database of the blockchain includes:

adding, by node devices with an accounting permission in the blockchain, the first transaction to a candidate block;

determining a consensus accounting node device satisfying a consensus mechanism of the blockchain from the node devices with the accounting permission;

broadcasting, by the consensus accounting node, the candidate block to node devices of the blockchain; and setting the candidate block as a latest block after the candidate block is verified and approved by a preset quantity of node devices in the blockchain, and adding the latest block to the distributed database of the blockchain.

In the foregoing embodiment, the node device with the accounting permission refers to a node device with a permission to generate a candidate block. The consensus accounting node device may be determined from the node devices having the accounting permission with respect to the candidate block according to the consensus mechanism of the blockchain. The consensus mechanism may include a proof of work (PoW) mechanism, a proof of stake (PoS) mechanism, or a delegated proof of stake (DPoS) mechanism.

The PoS or DPoS consensus mechanism is similar to the PoW consensus mechanism, and also belongs to a consensus algorithm commonly selected to determine a consensus accounting node device in a public blockchain. In another embodiment, to reduce a confirmation time of a transaction or data, improve the transaction throughput, and satisfy requirements on security and performance, the embodiments provided in the specification may further select a consortium blockchain architecture to construct the blockchain. The node devices of the service acceptance platform, of the service data processing entity, and of a service-related supervision agency may be used as preselected node devices of the consortium blockchain, to participate in accounting of blocks. A consensus process of the consortium blockchain is also controlled by the preselected node devices. When a block is confirmed by more than a preset proportion (such as ⅔) of node devices in a network, a transaction or data recorded by the block is confirmed by the entire network.

A consensus algorithm such as proof of stake, PBFT, or RAFT is usually used in the consortium blockchain. During implementation, before each round of consensus of the blockchain starts, a primary node device, that is, the consensus accounting node device described in the foregoing embodiment, may be selected from the node devices in the blockchain (for example, a new primary node device is selected in each round of consensus, and other node devices are used as secondary node devices). The primary node device further initiates verification and consensus of a transaction, and is responsible for creating a latest block for the blockchain based on transaction data (or target data) on which a consensus is reached.

The PBFT algorithm is used as an implementation of the consensus algorithm of the consortium blockchain provided in the specification, because the algorithm has high consensus efficiency and can satisfy requirements of a high-frequency transaction amount. For example, in this embodiment, the service acceptance platform generates a corresponding first transaction based on frequently accepted user service processing applications. In addition, the PBFT algorithm has a low consensus latency, basically satisfies requirements of real-time processing, and can quickly record the foregoing first transaction in a newly-generated block of the blockchain in real time. Moreover, trusted nodes in a consortium blockchain network are used as preselected accounting nodes, thereby achieving both security and stability. In addition, the PBFT algorithm does not consume excessive computing power resources of a computer, does not necessarily require the circulation of tokens, thereby having a good usability.

Step 108: The node device of the service data processing entity obtains, from the distributed database of the blockchain, the first transaction sent by the node device of the service acceptance platform.

The node device of the service data processing entity may synchronize the latest block based on a latest block generating frequency decided by the consensus mechanism of the blockchain, to obtain the first transaction. The blockchain based on a consortium blockchain architecture usually has high transaction processing throughput and data can be written into the blockchain almost in real time, thereby improving the efficiency of service processing.

Step 110: The node device of the service data processing entity generates a second service processing result according to a preset second service processing step and based on the first service processing result.

When the first service processing result included in the first transaction is encrypted using the public key of the service data processing entity, the node device of the service data processing entity decodes the encrypted data based on a private key corresponding to the public key. Then, plaintext of the first service processing result may be generated.

The node device of the service data processing entity performs service processing on the first service processing result according to a preset second service processing step, to generate the second service processing result. For example, an insurance agency may review insurance policy data generated by an insurance application acceptance platform. The review includes processes or steps such as checking authenticity of identity information of the target user included in the insurance policy data or an insurance application qualification certificate material, and checking whether the target user is qualified to participate in an insurance product purchased by the target user. Correspondingly, the second service processing result may include data indicating whether an insurance application of the target user passes the review, or premium amount data of the target user calculated based on the insurance policy data of the target user.

Step 112: The node device of the service data processing entity sends a second transaction to the blockchain, where the second transaction includes the second service processing result, for the second transaction to be recorded in a distributed database of the blockchain upon verification of the second transaction by the plurality of node devices associated with the blockchain according to the consensus mechanism.

For example, the node device of the service data processing entity may encapsulate the second service processing result into a second transaction according to a preset transaction format and send the second transaction to the blockchain. Because the second service processing result included in the second transaction usually also includes privacy information of the target user such as a premium amount, to avoid unexpected leakage or misuse of the privacy information of the target user, in the preset transaction format, encryption processing may be performed on the second service processing result included in the second transaction. In an embodiment, an encryption manner of the encryption processing may be encrypting the second service processing result using a public key of the node device of the service acceptance platform. In this way, after obtaining the second service processing result, the corresponding node device of the service acceptance platform may perform decoding using a private key of the node device of the service acceptance platform, to obtain plaintext information of the second service processing result, thereby reducing a security risk of data leakage when data is transmitted on the blockchain.

A process of recording the second transaction in the distributed database of the blockchain is similar to a process of recording the first transaction in the distributed database of the blockchain.

In another embodiment, because the service acceptance platform is usually used as a platform on which service acceptance and feedback are performed for the target user, the blockchain-based data processing method may further include step 114 (not shown in FIG. 1): the node device of the service acceptance platform obtains, from the distributed database of the blockchain, a second transaction sent by the node device of the service data processing entity, where the second transaction includes a second service processing result of the target user, sends the second service processing result to the target user.

The target user in this embodiment may also benefit from the timeliness of data uploading or synchronization on the blockchain in the foregoing embodiment, to effectively obtain a service processing result (that is, the second service processing result) of a service processing application in a timely manner, thereby improving service use experience of the target user.

The terminal device of the target user such as a PC terminal or a mobile device terminal may also be used as a node device of the blockchain, and directly obtain the second service processing result from the distributed database of the blockchain.

By using step 102 to step 110 in this embodiment, the service acceptance platform and the service data processing entity complete transmission of the first service processing result and the second service processing result based on the blockchain. Compared with the conventional http protocol data transmission mode or ftp protocol data transmission mode, this embodiment not only ensures the timeliness of the transmitted data, but also ensures that data backed up on the blockchain is tamper-poof. In addition, high usability and stability decided by the distributed architecture of the blockchain is far better than that of a single-node network. Therefore, the service stability has more advantages compared to that of the conventional manner. Compared with the http protocol data transmission mode, the node device of the service acceptance platform and the node device of the service data processing entity in the blockchain network complete respective service actions according to preset service processing steps, and coupling of data connection and debugging services does not exist between the two node devices, thereby greatly improving the efficiency of a connection message, and reducing costs.

The following describes the blockchain-based data processing method provided in the specification in detail by using the following service architectural mode: an insurance claim settlement platform as a front end to an insurance claim settlement agency as a backend.

Figure 2:
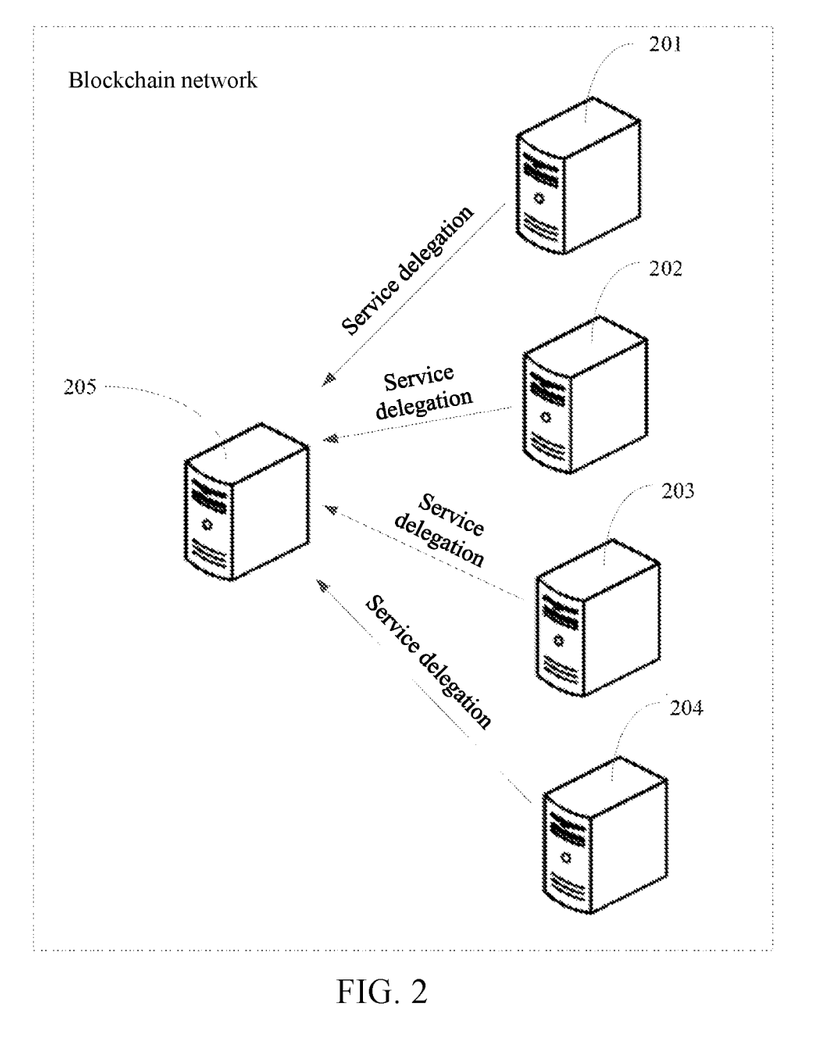
FIG. 2 is a schematic diagram of an organizational structure of a node device performing an insurance application service or an insurance claim settlement service in a blockchain network, according to an embodiment of the specification.

As shown in FIG. 2, one insurance platform may be connected to a plurality of insurance companies, to receive insurance applications of users and accept claim settlements. Correspondingly, the plurality of insurance companies may review the insurance applications of the users and review the claim settlements. Terminal devices 201 to 204 of the plurality of insurance companies and a terminal device 205 of the insurance all join in the blockchain network as the node devices of the blockchain, and transmit service data based on the distributed database of the blockchain.

Figure 3:
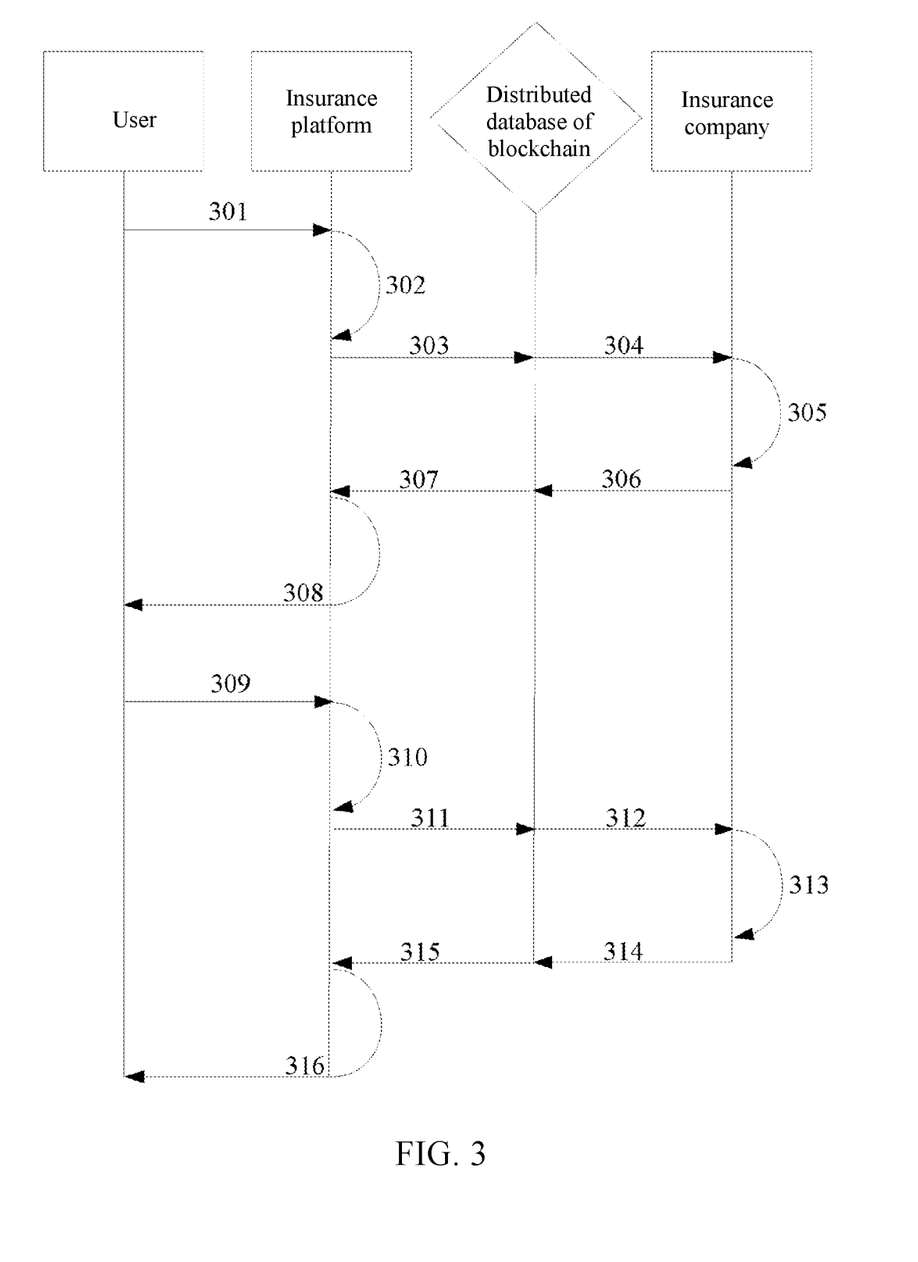
FIG. 3 is a flowchart of an insurance application service and an insurance claim settlement service performed in a blockchain network, according to an embodiment of the specification.

FIG. 3 shows a process of processing an insurance application service of a user and a claim settlement service of a user by the foregoing node device 201 of an insurance company and the foregoing node device 205 of the insurance platform.

Step 301: A target user initiates an insurance application for an insurance product based on a client of an insurance platform installed on a terminal device of the target user.

Step 302: The insurance platform generates, based on the insurance participation application of the target user, insurance policy data of the insurance product purchased by the target user, according to a preset insurance policy data generating step and by using process steps such as accepting an insurance application, obtaining insurance application data, charging an insurance application fee (which may be a pre-charged premium, where the final actual premium is charged by an insurance company agency after performing insurance underwriting according to the conditions of the target user), and generating insurance policy format data.

Step 303: A node device of the insurance platform encapsulates the insurance policy data of the insurance product purchased by the target user into an insurance policy transaction, and sends the insurance policy transaction to the blockchain, where based on a consensus and verification mechanism of the blockchain, the insurance policy transaction is recorded in a distributed database of the blockchain after verification according to a consensus mechanism.

Step 304: The node device of the insurance platform synchronously updates the distributed database of the blockchain, and obtains the insurance policy transaction from the database.

Step 305: The node device of the insurance company generates, based on the insurance policy data of the target user, an insurance application result of the target user, such as a notification of insurance application success information, a notification of a premium amount, or a notification of insurance application failure information, according to a preset insurance application result generating step and by using process steps such as checking authenticity and effectiveness of a certificate material of the target user included in the insurance policy data, performing accounting on a premium of the target user, assigning an insurance policy number to the insurance policy data, and signing and approving the insurance policy data.

Step 306: The node device of the insurance company encapsulates the insurance application result of the target user into an insurance application result transaction of the target user, and sends the insurance application result transaction to the blockchain, where based on the consensus and verification mechanism of the blockchain, the insurance application result transaction is included in the distributed database of the blockchain after verification according to a consensus mechanism.

Step 307: The node device of the insurance platform synchronously updates the distributed database of the blockchain, and obtains the insurance application result transaction from the database.

Step 308: The node device of the insurance platform notifies the target user of a user insurance application result, or updates an insurance application status of the target user or the like on the platform according to the insurance application result in the insurance application result transaction.

Step 301 to step 308 illustrate a process in which the target user uses the blockchain-based data processing method provided in the specification in an insurance application scenario. Similarly, the blockchain-based data processing method provided in the specification may also be used in a claim settlement scenario of the target user. For example, the method includes:

Step 309: A target user initiates, based on a client of an insurance platform installed on a terminal device of the target user, a claim settlement application of an insurance product purchased by the target user.

Step 310: The insurance platform generates, based on claim settlement application data of the target user, claim settlement report data of the target user according to a preset claim settlement report data generating step and by using process steps such as processing a claim examination material and accepting a report.

Step 311: The node device of the insurance platform encapsulates the claim settlement report data to generate a report transaction, and sends the report transaction to the blockchain, where based on a consensus and verification mechanism of the blockchain, the report transaction is recorded in a distributed database of the blockchain after verification according to a consensus mechanism.

Step 312: The node device of the insurance platform synchronously updates the distributed database of the blockchain, and obtains the report transaction from the database.

Step 313: The node device of the insurance company generates, based on the claim settlement report data, a compensation result of the target user, for example, notification information that the claim settlement review succeeds, a compensation amount, notification information that the claim settlement fails, information of causes of failed claim settlement, or other data, according to a preset compensation result generating step and by using process steps such as checking authenticity and effectiveness of a claim settlement certificate material of the target user included in the reporting transaction, and performing accounting on a claim settlement amount for the claim settlement report application of the target user.

Step 314: The node device of the insurance company encapsulates the compensation result of the target user into a compensation result transaction, and sends the compensation result transaction to the blockchain, where based on the consensus and verification mechanism of the blockchain, the compensation result transaction is recorded in the distributed database of the blockchain after verification according to a consensus mechanism.

Step 315: The node device of the insurance platform synchronously updates the distributed database of the blockchain, and obtains the compensation result transaction from the database.

Step 316: The node device of the insurance platform notifies the target user of the notification information that the claim settlement review succeeds, the compensation amount, the notification information that the claim settlement fails, the information of causes of failed claim settlement, or the like according to the compensation result in the compensation result transaction.

When a terminal of the target user is also a node device of the blockchain, the node device of the insurance company may remit (or referred to as transfer), based on the compensation amount included in the compensation result, an asset certificate corresponding to the compensation amount to a blockchain account of the target user on the blockchain. The asset certificate may correspond to smart assets such as tokens or digital assets in the blockchain, or may correspond to off-chain assets such as cash, securities, coupons, or house property outside the blockchain. A payment result of the compensation may also be included in the scope of the compensation result.

Figure 4:
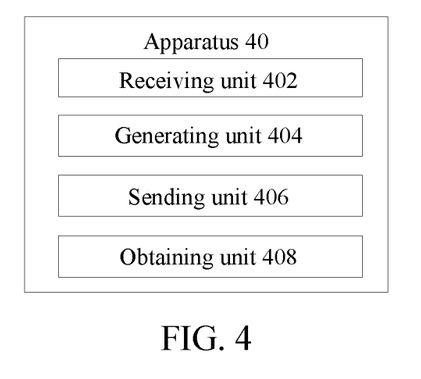
FIG. 4 is a schematic diagram of a data processing apparatus applied to a node device end of a service acceptance platform, according to an embodiment of the specification.
Figure 5:
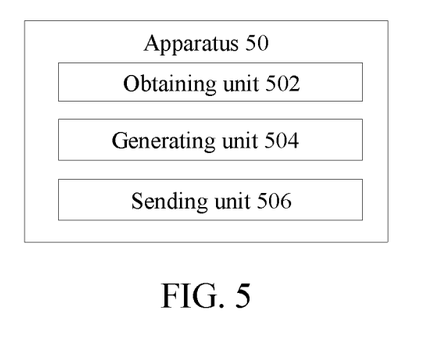
FIG. 5 is a schematic diagram of a data processing apparatus applied to a node device end of a service data processing entity, according to an embodiment of the specification.

Corresponding to the embodiments of the foregoing processes, an embodiment of the specification further provides blockchain-based data processing apparatuses 40 and 50. The apparatus 40 or 50 may be implemented by software, hardware, or a combination of software and hardware. Using software implementation as an example, a logical apparatus is formed by reading a corresponding computer program instruction and writing the instruction into an internal memory for running through a central processing unit (CPU) of a device on which the apparatus is located. From a hardware perspective, in addition to the CPU, internal memory, and memory shown in FIG. 6, the device for implementing a blockchain-based data-processing apparatus is located usually includes other hardware, such as a chip for wireless signal transmission and receiving, and/or other hardware, such as a board card for implementing network communication functions.

FIG. 4 shows a blockchain-based data processing apparatus 40. A blockchain includes a node device of a service acceptance platform and a node device of a service data processing entity. The apparatus 40 is applicable to a node device end of the service acceptance platform, and includes:

a receiving unit 402, configured to receive service processing application data of a target user;

a generating unit 404, configured to generate a first service processing result according to a preset first service processing step and based on the service processing application data; and a sending unit 406, configured to send a first transaction to the blockchain, where the first transaction includes the first service processing result, for the first transaction to be recorded in a distributed database of the blockchain after verification by the blockchain according to a consensus mechanism, and the first service processing result is used for allowing the node device of the service data processing entity to generate a second service processing result according to a preset second service processing step and based on the first service processing result.

In another embodiment, the apparatus 40 further includes:

an obtaining unit 408, configured to obtain, from the distributed database of the blockchain, a second transaction sent by the node device of the service data processing entity, where the second transaction includes the second service processing result of the target user, and the sending unit 406 is further configured to send the second service processing result to the target user.

In another embodiment, the first service processing result is encrypted using a public key of the node device of the service processing.

In another embodiment, the node device of the service acceptance platform is a node device of an insurance application acceptance platform, the node device of the service data processing entity is a node device of an insurance application review agency, and the service processing application data of the target user is insurance application data of the target user.

The first service processing step is a step of generating insurance policy data, and the first service processing result is the insurance policy data.

The second service processing step is a step of generating an insurance application result, and the second service processing result is the insurance application result.

In another embodiment, the node device of the service acceptance platform is a node device of a claim settlement acceptance platform, the node device of the service data processing entity is a node device of a claim settlement review agency, and the service processing application data of the target user is claim settlement application data of the target user.

The first service processing step is a step of generating claim settlement report data, and the first service processing result is the claim settlement report data.

The second service processing step is a step of generating a compensation result, and the second service processing result is the compensation result.

In another embodiment, the blockchain is a consortium blockchain, and the node device of the service acceptance platform and the node device of the service data processing entity are consortium member node devices.

FIG. 5 shows a blockchain-based data processing apparatus 50. A blockchain includes a node device of a service acceptance platform and a node device of a service data processing entity. The apparatus 50 is applicable to a node device end of the service data processing entity, and includes:

an obtaining unit 502, configured to obtain a first transaction sent by the node device of the service acceptance platform from a distributed database of the blockchain, where the first transaction includes a first service processing result, and the first service processing result is generated by the node device of the service acceptance platform according to a preset first service processing step and based on received service processing application data of a target user;

a generating unit 504, configured to generate a second service processing result according to a preset second service processing step and based on the first service processing result; and a sending unit 506, configured to send a second transaction to the blockchain, where the second transaction includes the second service processing result, for the second transaction to be recorded in the distributed database of the blockchain after verification by the blockchain according to a consensus mechanism.

In another embodiment, the second service processing result is encrypted using a public key of the node device of the service acceptance platform.

In another embodiment, the node device of the service acceptance platform is a node device of an insurance application acceptance platform, the node device of the service data processing entity is a node device of an insurance application review agency, and the service processing application data of the target user is insurance application data of the target user.

The first service processing step is a step of generating insurance policy data, and the first service processing result is the insurance policy data.

The second service processing step is a step of generating an insurance application result, and the second service processing result is the insurance application result.

In another embodiment, the node device of the service acceptance platform is a node device of a claim settlement acceptance platform, the node device of the service data processing entity is a node device of a claim settlement review agency, and the service processing application data of the target user is claim settlement application data of the target user.

The first service processing step is a step of generating claim settlement report data, and the first service processing result is the claim settlement report data.

The second service processing step is a step of generating a compensation result, and the second service processing result is the compensation result.

For details of the implementation processes of the functions and effects of the units in the apparatuses 40 and 50, reference may be made to the implementation processes of corresponding steps in the foregoing method. For related parts, refer to partial descriptions in the method embodiment.

The apparatus embodiments described above are merely some of the embodiments. The units described as separate parts may or may not be physically separate, and the parts displayed as units may or may not be physical modules, may be located in one position, or may be distributed on a plurality of network modules. A part or all of the units or modules may be selected according to actual requirements to achieve the objectives of the solutions of the specification. A person of ordinary skill in the art may understand and implement the solutions without creative efforts.

The apparatus, the unit or the module described in the foregoing embodiments can be implemented by a computer chip or an entity or implemented by a product having a certain function. A typical implementation device is a computer, and the computer may be in a form of a personal computer, a laptop computer, a cellular phone, a camera phone, a smartphone, a personal digital assistant, a media player, a navigation device, an email device, a game console, a tablet computer, a wearable device, or a combination of any of these devices.

Figure 6:
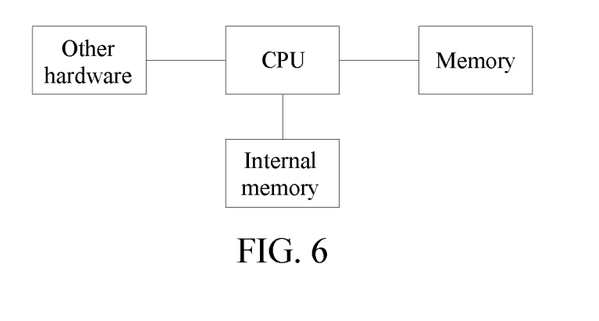
FIG. 6 is a diagram of a hardware structure executing a blockchain-based data processing apparatus, according to an embodiment of the specification.

Corresponding to the method embodiment, an embodiment of the specification further provides a computer device. As shown in FIG. 6, the computer device includes a memory and a processor. The memory stores a computer program runnable by the processor. The processor, when running the computer program, performs the steps of the blockchain-based data processing method performed by a node device end of a service acceptance platform in the embodiments of the specification. Detailed descriptions of the steps of the blockchain-based data processing method performed by the node device end of the service acceptance platform, may be referred to previous content.

Corresponding to the method embodiment, an embodiment of the specification further provides a computer device. As shown in FIG. 6, the computer device includes a memory and a processor. The memory stores a computer program runnable by the processor. The processor, when running the computer program, performs the steps of the blockchain-based data processing method performed by a node device end of a service data processing entity in the embodiments of the specification. Detailed descriptions of the steps of the blockchain-based data processing method performed by the node device end of the service data processing entity, may be referred to previous content.

The foregoing descriptions are some embodiments of the specification, but do not limit the specification. Any modification, equivalent replacement, or improvement made without departing from the spirit and principle of the specification fall within the protection scope of the specification.

In a typical configuration, a computing device includes one or more processors (CPUs), an input/output interface, a network interface, and an internal memory.

The internal memory may include the following forms of computer-readable media: a non-persistent memory, a random access memory (RAM), and/or a nonvolatile internal memory, for example, a read-only memory (ROM) or a flash memory (flash RAM). The internal memory is an example of the computer-readable medium.

The computer-readable medium includes a persistent medium and a non-persistent medium, a removable medium and a non-removable medium, which may implement storage of information by using any method or technology. The information may be computer-readable instructions, a data structure, a module of a program, or other data. Examples of computer storage media include but are not limited to a phase change memory (PRAM), a static random access memory (SRAM), a dynamic random access memory (DRAM), another type of RAM, a ROM, an electrically erasable programmable read-only memory (EEPROM), a flash memory or other internal memory technology, a compact disc read-only memory (CD-ROM), a digital versatile disc (DVD) or other optical storage, a cassette magnetic tape, tape and disk storage or other magnetic storage device or any other non-transmission media that may be configured to store information accessible by the computing device. According to the definition in the specification, the computer-readable medium does not include transitory computer-readable media (transitory media) such as a modulated data signal and a carrier.

It should also be noted that the terms "include," "comprise" and any other variants mean to cover the non-exclusive inclusion. Therefore, the process, method, article, or device that includes a series of elements not only includes those elements, but also includes other elements not clearly listed, or include the elements inherent to the process, method, article or device. Without further limitation, the element defined by a phrase "include one . . . " does not exclude other same elements in the process, method, article, or device that includes the element.

A person skilled in the art should understand that the embodiments of the specification may be provided as a method, a system, or a computer program product. Therefore, the embodiments of the specification may use a form of hardware only embodiments, software only embodiments, or embodiments with a combination of software and hardware. Moreover, the embodiments of the specification may use a form of a computer program product that is implemented on one or more computer-usable storage media (including but not limited to a disk memory, a CD-ROM, an optical memory, and the like) that include computer-usable program code.

What is claimed is:

1. A blockchain-based data processing method, comprising:
   receiving, by a node device of a service acceptance platform, service processing application data of a target user;
   generating, by the node device of the service acceptance platform based on the service processing application data, a first service processing result;
   encrypting, by the node device of the service acceptance platform, the first service processing result using a public key of a node device of a service data processing entity; and
   sending, by the node device of the service acceptance platform, a first transaction to a blockchain, the first transaction being recorded in a distributed database of the blockchain upon verification of the first transaction according to a consensus mechanism, wherein:
      the first transaction is recorded in the distributed database of the blockchain by,
         selecting, before a round of consensus of the blockchain starts, one node device from a plurality of node devices associated with the blockchain as a primary node device, and setting other node devices associated with the blockchain as secondary node devices,
         verifying, by the primary node device, the first transaction,
         adding, by the primary node device and upon verification of the first transaction, the first transaction to a candidate block,
         broadcasting, by the primary node device, the candidate block to the secondary node devices, and
         setting the candidate block as a latest block after the candidate block is approved by a preset quantity of the secondary node devices, and adding the latest block to the distributed database of the blockchain;
      the first transaction comprises the encrypted first service processing result; and
      the plurality of node devices associated with the blockchain comprises the node device of the service acceptance platform and the node device of the service data processing entity.

2. The method of claim 1, further comprising:
   obtaining, by the node device of the service acceptance platform from the distributed database of the blockchain, a second transaction comprising a second service processing result of the target user generated by the node device of the service data processing entity; and
   sending the second service processing result to the target user.

3. The method of claim 2, wherein the second service processing result is encrypted using a public key of the node device of the service acceptance platform.

4. The method of claim 1, wherein:
   the service acceptance platform comprises an insurance application acceptance platform;
   the service data processing entity comprises an insurance application review agency;
   the service processing application data comprises insurance application data of the target user;
   the first service processing result comprises insurance policy application data; and
   the second service processing result comprises an insurance application result of the target user.

5. The method of claim 1, wherein:
   the service acceptance platform comprises a claim settlement acceptance platform;
   the service data processing entity comprises a claim settlement review agency;
   the service processing application data comprises claim settlement application data of the target user;
   the first service processing result comprises claim settlement report data; and
   the second service processing result comprises a compensation result for the target user.

6. The method of claim 1, wherein:
   the blockchain is a consortium blockchain; and
   the node device of the service acceptance platform and the node device of the service data processing entity are consortium member node devices of the consortium blockchain.

7. The method of claim 1, further comprising:
   obtaining, by the node device of the service data processing entity from the distributed database of the blockchain, the first transaction;
   generating, by the node device of the service data processing entity, a second service processing result based on the first service processing result;
   encrypting, by the node device of the service data processing entity, the second service processing result using a public key of the node device of the service acceptance platform; and
   sending, by the node device of the service data processing entity, a second transaction to the blockchain for the second transaction to be recorded in the distributed database of the blockchain upon verification of the second transaction by the plurality of node devices associated with the blockchain according to the consensus mechanism, wherein the second transaction comprises the encrypted second service processing result.

8. A system for blockchain-based data-processing, comprising a processor and a non-transitory computer-readable storage medium storing instructions executable by the processor to cause the system to perform operations comprising:
   receiving service processing application data of a target user;
   generating, based on the service processing application data, a first service processing result;
   encrypting the first service processing result using a public key of a node device of a service data processing entity; and
   sending a first transaction to a blockchain, the first transaction being recorded in a distributed database of the blockchain upon verification of the first transaction according to a consensus mechanism, wherein:
the first transaction is recorded in the distributed database of the blockchain by,
selecting, before a round of consensus of the blockchain starts, one node device from a plurality of node devices associated with the blockchain as a primary node device, and setting other node devices associated with the blockchain as secondary node devices,
verifying, by the primary node device, the first transaction,
adding, by the primary node device and upon verification of the first transaction, the first transaction to a candidate block,
broadcasting, by the primary node device, the candidate block to the secondary node devices, and
setting the candidate block as a latest block after the candidate block is approved by a preset quantity of the secondary node devices, and adding the latest block to the distributed database of the blockchain;
the first transaction comprises the encrypted first service processing result; and
the plurality of node devices associated with the blockchain comprises the node device of the service acceptance platform and the node device of the service data processing entity.

9. The system of claim 8, wherein the operations further comprise:
obtaining, from the distributed database of the blockchain, a second transaction comprising a second service processing result of the target user generated by the node device of the service data processing entity; and
sending the second service processing result to the target user.

10. The system of claim 9, wherein the second service processing result is encrypted using a public key of the node device of the service acceptance platform.

11. The system of claim 8, wherein:
the service acceptance platform comprises an insurance application acceptance platform;
the service data processing entity comprises an insurance application review agency;
the service processing application data comprises insurance application data of the target user;
the first service processing result comprises insurance policy application data; and
the second service processing result comprises an insurance application result of the target user.

12. The system of claim 8, wherein:
the service acceptance platform comprises a claim settlement acceptance platform;
the service data processing entity comprises a claim settlement review agency;
the service processing application data comprises claim settlement application data of the target user;
the first service processing result comprises claim settlement report data; and
the second service processing result comprises a compensation result for the target user.

13. The system of claim 8, wherein:
the blockchain is a consortium blockchain; and
the node device of the service acceptance platform and the node device of the service data processing entity are consortium member node devices of the consortium blockchain.

14. The system of claim 8, wherein the operations further comprise:
obtaining, from the distributed database of the blockchain, the first transaction;
generating a second service processing result based on the first service processing result;
encrypting the second service processing result using a public key of the node device of the service acceptance platform; and
sending a second transaction to the blockchain for the second transaction to be recorded in the distributed database of the blockchain upon verification of the second transaction by the plurality of node devices associated with the blockchain according to the consensus mechanism, wherein the second transaction comprises the encrypted second service processing result.

15. A non-transitory computer-readable storage medium for image processing, configured with instructions executable by one or more processors to cause the one or more processors to perform operations comprising:
receiving service processing application data of a target user;
generating, based on the service processing application data, a first service processing result;
encrypting the first service processing result using a public key of a node device of a service data processing entity; and
sending a first transaction to a blockchain, the first transaction being recorded in a distributed database of the blockchain upon verification of the first transaction according to a consensus mechanism, wherein:
the first transaction is recorded in the distributed database of the blockchain by,
selecting, before a round of consensus of the blockchain starts, one node device from a plurality of node devices associated with the blockchain as a primary node device, and setting other node devices associated with the blockchain as secondary node devices,
verifying, by the primary node device, the first transaction,
adding, by the primary node device and upon verification of the first transaction, the first transaction to a candidate block,
broadcasting, by the primary node device, the candidate block to the secondary node devices, and
setting the candidate block as a latest block after the candidate block is approved by a preset quantity of the secondary node devices, and adding the latest block to the distributed database of the blockchain;
the first transaction comprises the encrypted first service processing result; and
the plurality of node devices associated with the blockchain comprises the node device of the service acceptance platform and the node device of the service data processing entity.

16. The medium of claim 15, wherein the operations further comprise:
obtaining, from the distributed database of the blockchain, a second transaction comprising a second service processing result of the target user generated by the node device of the service data processing entity; and
sending the second service processing result to the target user.

17. The medium of claim 16, wherein the second service processing result is encrypted using a public key of the node device of the service acceptance platform.

18. The medium of claim 15, wherein:
the service acceptance platform comprises an insurance application acceptance platform;
the service data processing entity comprises an insurance application review agency;
the service processing application data comprises insurance application data of the target user;
the first service processing result comprises insurance policy application data; and
the second service processing result comprises an insurance application result of the target user.

19. The medium of claim 15, wherein:
the service acceptance platform comprises a claim settlement acceptance platform;
the service data processing entity comprises a claim settlement review agency;
the service processing application data comprises claim settlement application data of the target user;
the first service processing result comprises claim settlement report data; and
the second service processing result comprises a compensation result for the target user.

20. The medium of claim 15, wherein the operations further comprise:
obtaining, from the distributed database of the blockchain, the first transaction;
generating a second service processing result based on the first service processing result;
encrypting the second service processing result using a public key of the node device of the service acceptance platform; and
sending a second transaction to the blockchain for the second transaction to be recorded in the distributed database of the blockchain upon verification of the second transaction by the plurality of node devices associated with the blockchain according to the consensus mechanism, wherein the second transaction comprises the encrypted second service processing result.

* * * * *